Jan. 21, 1969 A. MANOOGIAN 3,422,849
MIXING VALVE

Filed June 7, 1966 Sheet 1 of 2

INVENTOR.
ALEX MANOOGIAN
BY Whittemore, Hulbert
& Belknap
ATTORNEYS

Jan. 21, 1969 A. MANOOGIAN 3,422,849
MIXING VALVE
Filed June 7, 1966 Sheet 2 of 2

INVENTOR.
ALEX MANOOGIAN
BY Whittemore,
Hulbert & Belknap

ATTORNEYS

United States Patent Office 3,422,849
Patented Jan. 21, 1969

3,422,849
MIXING VALVE
Alex Manoogian, Detroit, Mich., assignor to Masco Corporation, Detroit, Mich., a corporation of Michigan
Filed June 7, 1966, Ser. No. 555,832
U.S. Cl. 137—625.41                              7 Claims
Int. Cl. F16k 11/02, 5/20

This invention relates to an improved ball type mixing valve and has particular reference to a ball type hot and cold water mixing valve in which the ball member is isolated from the valve seat by a flexible diaphragm so as to be isolated from the water passing through the valve. The ball member carries a valving face on the surface thereof so that the mix and flow of the hot and cold water passing through the valve are independently variable. Because the ball member is not exposed to the corroding effects of the water passing through the valve, the valve has a longer useful life and an easier valve operation than conventional mixing valves where the ball is exposed to the water.

Accordingly, an object of the invention is to provide an improved ball type mixing valve.

Another object of the invention is to provide a diaphragm type fluid mixing valve having a long useful life wherein the operating parts of the valve are isolated from the fluid passing through the valve.

Other objects and features of the invention will become apparent as the description proceeds, especially when taken in conjunction with the accompanying drawings, illustrating a preferred embodiment of the invention, wherein:

FIGURE 1 is a sectional view taken along line 1—1 of FIGURE 2, showing the valve seat with the ball and diaphragm removed therefrom;

FIGURES 2 and 3 are sectional views of the valve taken along lines 2—2 and 3—3, respectively, of FIGURE 1;

Figure 7:
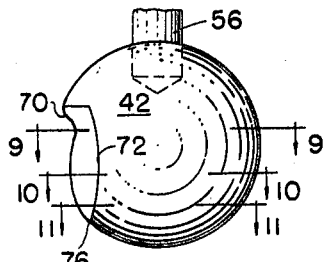
FIGURE 7 is a side elevational view of the ball valve member according to the invention.
Figure 8:
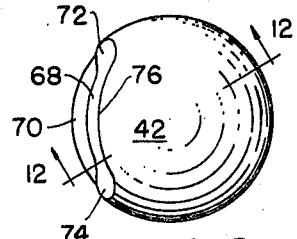
FIGURE 8 is a bottom view of the ball valve member.
Figure 9:
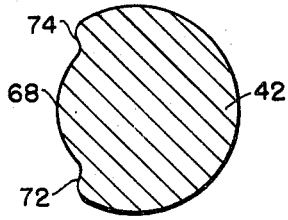
Figure 10:
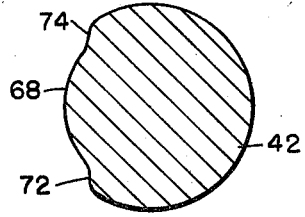
Figure 11:
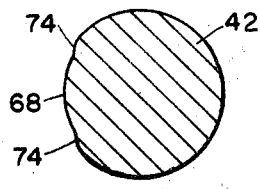
Figure 12:
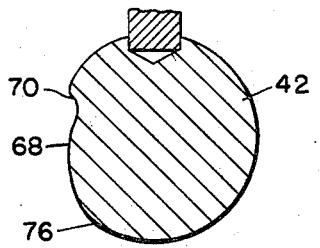

FIGURES 9, 10 and 11 are sectional views taken along lines 9—9, 10—10, and 11—11, respectively, of FIGURE 7; and FIGURE 12 is a sectional view taken along line 12—12 of FIGURE 8.

Figure 1:
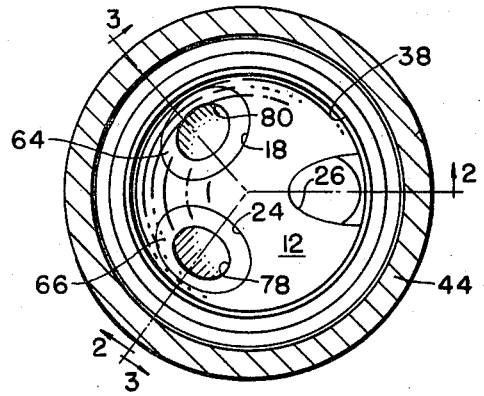
Figure 3:
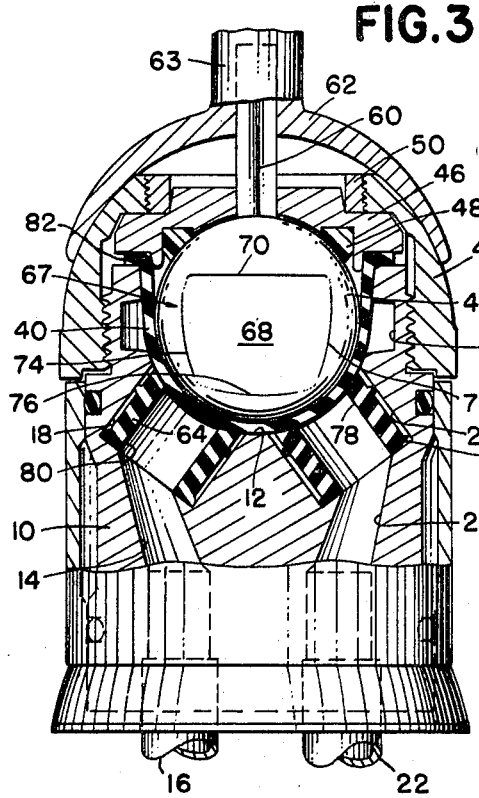
Figure 2:
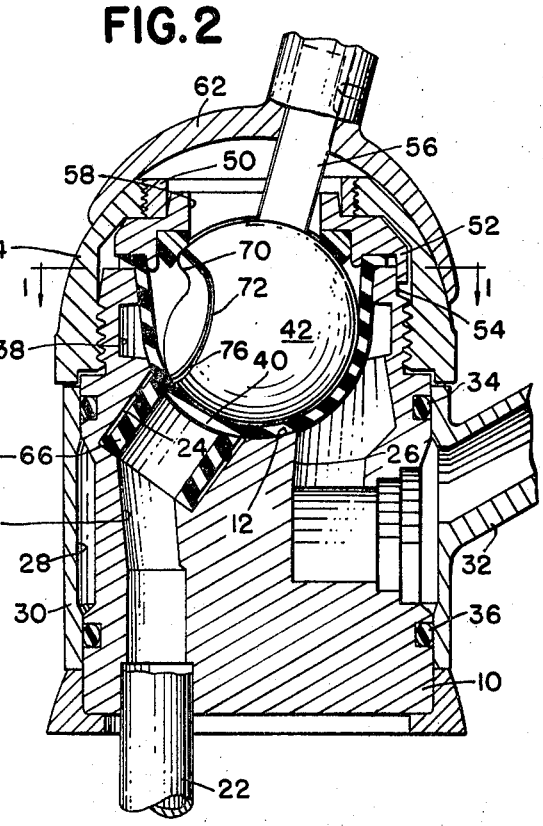

As shown in the drawing and particularly in FIGURES 2 and 3, the valve comprises a metal valve body 10 with a spherical valve seat 12 in one end thereof. The valve body has a cold water inlet passageway 14 passing therethrough and connected to a cold water pipe 16 from which cold water is supplied to the valve. The inlet passageway 14 ends in a cold water inlet 18 in the valve seat 12. A hot water inlet passageway 20 is connected to a hot water pipe 22 and ends in a hot water inlet 24 located adjacent the cold water inlet 18 to one side of the valve seat 12, as most clearly illustrated in FIGURE 1. Outlet duct 26 is located at the other side of seat 12 away from the hot and cold water inlets 18 and 24 and communicates with an annular chamber 28 located between spout collar 30 and the valve body 10. Spout 32 is carried on collar 30 and serves as an outlet for the mixing valve. O-rings 34 and 36 are provided at either end of the chamber 28 to prevent leakage between the valve body 10 and collar 30.

An annular mixing groove 38 extends around the valve seat 12 and is in continuous fluid flow communication with the outlet duct 26. As shown in FIGURES 1 and 3, the groove 38 passes adjacent the inlets 18 and 24 and is equally spaced therefrom.

A flexible valving diaphragm 40 is fitted within valve seat 12. A generally spherical ball valve 42 is disposed between the diaphragm 40 and a nylon retaining ring 46 which may be provided with a suitable retaining gasket 48 which holds the ball valve 42 against the seat 12.

Valve cap 44 is threadedly secured to the valve body 10 and carries a threaded adjustment ring 50 which engages ring 46 so that the pressure under which ball 42 is held against its seat may be adjusted. Ring 46 carries a key 52 which is engaged within slot 54 in the base 10 as shown in FIGURE 2 so as to prevent rotation of the nylon ring 46 during tightening down of the adjustment ring 50.

Ball valve 42 is provided with a radial stem 56 which extends through control slot 58 in the nylon ring 46. Slot 58 extends perpendicular to a line joining the centers of inlets 18 and 24 and is equally spaced from the inlets so that when the ball valve is rotated by moving stem 56 along the slot 58 between the positions illustrated in FIGURES 2 and 4, the ball is rotated about a first axis parallel to the line joining the centers of the inlets 18 and 24.

Figure 6:
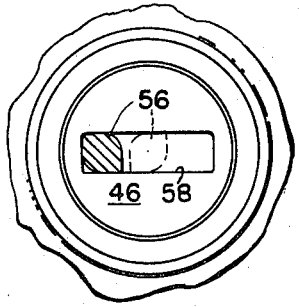

As illustrated in FIGURE 6, the ball valve 42 may also be rotated in socket 12 about the axis of the stem 56 independently of the position of the stem in the slot 58. Such rotation of the ball is limited by stops 60 on stem 56 which engage the side walls of slot 58. A valve cover 62 may be attached to stem 56 to provide a suitable covering for the top of the valve. Cover 62 includes a handle portion 63 which may be moved to effect desired mix and flow of hot and cold water through the valve.

Annular rubber sealing gaskets 64 and 66 are seated respectively in cold water inlet 18 and hot water inlet 24 as shown in FIGURE 3 and cooperate with diaphragm 40 to prevent the flow of water through the valve when the ball 42 is positioned in the off position of FIGURES 2 and 3. The ball 42 holds the diaphragm 40 tightly against the ends of the sealing gaskets 64 and 66 to prevent fluid flow.

The ball valve 42 is provided with a recessed, quadrilaterally shaped valving surface 67 on the surface thereof positioned generally adjacent the hot and cold water inlets 18 and 24. The valving surface 67 comprises a recessed central portion 68 having a radius less than the radius of the ball valve 42 with smoothly contoured abrupt side walls 70, 72 and 74 on three sides thereof. The recessed portion 68 smoothly merges with the surface of ball valve 42 so that the radius of curvature of a line defined by the intersetcion of a diametral plane through the recessed portion 68 has a gradually decreasing value from the edge 76 of portion 68 toward the side 70.

As best illustrated in FIGURE 3, the valving surface 67 is symmetrical about a diametral plane perpendicular to the first axis of rotation of the ball valve 42 when the stem 56 is positioned in slot 58 with stops 60 aligned along the axis of the slot. The valving surface 67 is positioned on ball valve 42 so that the axis of the stem 56 lines in the plane of symmetry thereof. Similar side walls 72 and 74 of valving surface 67 decrease in height from the ends thereof adjacent side wall 70 toward the edge 76 where they smoothly merge into the spherical surface of ball 42.

The ball valve as described herein may be used to independently and smoothly vary the mix and flow of the hot and cold water passing through the valve by rotating the ball 42 about either of two mutually perpendicular axes of rotation. By rocking the stem 56 back and forth along slot 58 the ball valve 42 is rotated about a first axis oriented parallel to a line joining the centers of the inlet ports 78 and 80 defined by the axial bores through sealing members 66 and 64. Rotation of the ball about this axis varies the volume of water passing through the valve without substantially altering the mix of the flow.

The ball 42 may also be rotated about the axis of stem 56 by twisting handle 63 within the limit allowed by stops 60 as illustrated in the solid and dotted sections of the stem shown in FIGURE 6. Rotation of the ball about this axis varies the mix of the water flowing through the valve without substantially altering the quantity of flow passing therethrough.

Figure 5:
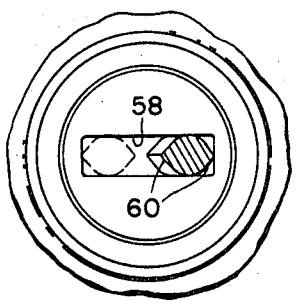
FIGURES 5 and 6 are views illustrating the movement of the ball valve on its seat.

When the ball 42 is positioned in the off position as indicated in FIGURES 2 and 3, the stem 56 is positioned as shown in solid lines in FIGURE 5 at the end of the slot 58 away from the inlet ports 78 and 80. When in this position the spherical surface of ball member 42 holds the resilient diaphragm 40 in sealing contact with the ends of both sealing gaskets 64 and 66 so as to effect a fluid-tight seal therebetween and prevent water from flowing through the mixing valve. By moving the stem 56 toward the other end of slot 58 the ball valve is rotated about the first axis so that the side 76 of the valving surface 67 is gradually swept over the inlet ports 78 and 80 thus allowing the pressure of the water from the cold and hot water pipes 16 and 22 to push the diaphragm 40 away from sealing engagement with the gaskets 64 and 66 so as to allow a flow of water to pass therethrough and into the annular mixing groove 38. Water passing through this groove flows through the outlet duct 26 and annular chamber 28 into spout 32. When the valving surface 67 is symmetrically oriented relative to the inlet ports 78 and 80 as shown in FIGURE 3, movement of the valve stem 56 along slot 58 results in equal amounts of hot and cold water flowing through the inlet ports 78 and 80 with the total flow being dependent upon the position of the stem in the slot.

Figure 4:
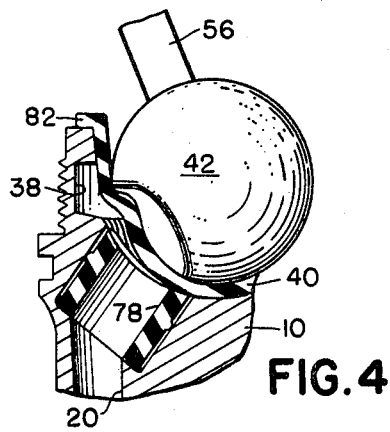
FIGURE 4 is a view of a part of FIGURE 2 with the ball shown in the full flow position.

When the stem 56 is positioned against the end of the slot 58 adjacent the inlet ports, the valve is in the full flow position so that if the orientation of the stem 56 is as shown in dotted lines in FIGURE 5, the portion of diaphragm 40 located immediately above each of the sealing gaskets 64 and 66 is lifted from total engagement with the gaskets so as to permit maximum fluid flow through both of the inlet ports to the annular groove 38 as shown in FIGURE 4. As shown in FIGURE 4, the spherical diaphragm 40 is always partially held in contact with the sealing gaskets 64 and 66 by ball 42 so as to prevent these gaskets from lifting out of the hot and cold water inlets 24 and 18, and restricting flow through the valve. The hot and cold water inlet ports 78 and 80 are each equally spaced from the annular groove 38 so that when symmetrical portions of the valving surface 67 are positioned above each inlet port a like flow of water passes through each port and into the groove 38.

Rotation of the ball valve about the axis of stem 56 sweeps the side walls 72 and 74 of the recessed valving surface past the inlet ports 78 and 80 so as to vary the mix of the water flowing through the valves while maintaining the flow at a relatively constant value. When the stem is positioned against the full flow end of slot 58 and is rotated about its axis to the full clockwise or cold position as shown in solid lines in FIGURE 6, the hot water inlet port 78 is closed by diaphragm 40 and the cold water inlet port 80 is opened to the full flow position so that cold water only passes through the valve. As the stem is moved from this position towards the other end of slot 58 the ball is rotated about the first axis and the side 76 of the valving surface 67 is swept over the cold water inlet port 80 so as to gradually reduce the flow therethrough until the off position is reached and the cold water flow is completely stopped. Likewise movement of the stem 56 along the slot 58 when it is rotated to the full counterclockwise or hot position varies the hot water flow through the valve from full flow to off. The stem 56 may be rotated about its axis at any position in slot 58 to vary the mix passing through the valve by sweeping the surface 67 past the inlet ports 78 and 80.

The smooth contour of the sides of the valving surface 67 assures that as the ball valve 42 is moved in socket 12 the diaphragm 40 is not injured or cut by the ball 42. By tightening down cap 44 and adjustment ring 50, a watertight seal is achieved between the edge 82 of diaphragm 40 and the top of the valve body. The diaphragm 40 prevents any water from reaching the ball 42 and other operating parts of the valve and thus has the advantage of keeping these parts free from the corroding effects of water so as to provide longer valve life and easier valve operation.

What I claim as my invention is:

1. A mixing valve comprising a body having two inlet passageways, an outlet duct, and a generally spherical valve seat located therein with the inlet passageways ending in two spaced inlet ports in the seat at one side thereof, a groove in said body communicating with said seat to provide a mixing chamber, said groove being in fluid flow communication with said outlet duct and extending around said seat from said outlet duct toward said inlet ports, said inlet ports being equally spaced from said groove, a generally spherical flexible diaphragm fitted in said seat and sealed to said body at its periphery, said diaphragm overlying said inlet ports and said groove, a spherical ball valve positioned within said diaphragm so as to normally hold said diaphragm against said seat to seal said inlet ports and groove and prevent fluid flow through said valve, said ball valve having a smoothly recessed valving surface thereon so that upon movement of said ball valve to an open position thereof fluid from at least one of said inlet ports flexes said diaphragm away from said seat and against said valving surface to open such inlet port and said groove and permit fluid flow therethrough, and means limiting motion of the ball valve in said seat to rotation about two mutually perpendicular axes whereby rotation of said ball valve about the first of said axes sweeps said valving surface across said inlet ports in a first direction along a line joining the centers of said inlet ports so as to vary the mix of the fluid passing through the mixing valve and rotation of said ball valve about the second of said axes sweeps said valving surface relative to said inlet ports in a second direction perpendicular to said first direction so as to vary the fluid flow passing through the mixing valve.

2. A mixing valve as in claim 1 wherein said groove comprises an annular recess extending around said valve seat outwardly from said inlet ports.

3. A mixing valve as in claim 1 wherein resilient sealing means are seated in said inlet ports for engagement with said diaphragm when the valve is closed so as to prevent fluid flow therethrough.

4. A mixing valve as in claim 1 wherein said valving surface includes a central portion recessed below the surface of said ball valve, and a contoured side wall partially surrounding said central portion, said central portion gradually merging with the surface of said ball valve so that the radius of curvature of a line defined by the intersection of a diametral plane with said recessed central portion of said valving surface has a smoothly decreasing valve from the surface of said ball valve toward said side wall.

5. A mixing valve as in claim 4 wherein said groove comprises an annular recess extending around said valve seat outwardly from said inlet ports.

6. A mixing valve as in claim 4 wherein said valving surface is symmetrical about a diametral plane perpendicular to said second axis when the ball valve is in the equal flow position.

7. A mixing valve as in claim 6 wherein said second axis is parallel to a line joining the centers of said inlet ports and said first axis lies in said last-mentioned diametral plane.

References Cited

UNITED STATES PATENTS 2,592,062   4/1952   Perry _____ 251—315 X

M. CARY NELSON, *Primary Examiner.*

J. R. DWELLE, *Assistant Examiner.*

U.S. Cl. X.R.

251—315